United States Patent [19]

Filho et al.

[11] Patent Number: 4,475,484
[45] Date of Patent: Oct. 9, 1984

[54] EXHAUST MANIFOLD FOR AN INTERNAL COMBUSTION ENGINE, APPARATUS FOR THE CATALYTIC TRANSFORMATION OF FUEL AND IMPROVED INTERNAL COMBUSTION ENGINE

[76] Inventors: Antonio V. Filho, Rua Luther King, 41-Belo Horizonte-MG; Pietrangelo V. De Biase, Av. Prefeito Mendes Moraes, 1300/401-Rio de Janeiro-RJ, both of Brazil

[21] Appl. No.: 552,888

[22] Filed: Nov. 17, 1983

Related U.S. Application Data

[63] Continuation of Ser. No. 351,394, Feb. 23, 1982, abandoned.

[30] Foreign Application Priority Data

Feb. 27, 1981 [BR] Brazil .................................. 8101247

[51] Int. Cl.³ .......................................... F02M 25/06
[52] U.S. Cl. ........................................ 123/3; 123/1 A; 123/576; 123/DIG. 12; 60/274
[58] Field of Search .................. 123/1 A, 3, DIG. 12, 123/576, 557; 60/274; 48/61

[56] References Cited

U.S. PATENT DOCUMENTS

| | | | |
|---|---|---|---|
| 3,828,736 | 8/1974 | Koch | 123/3 |
| 3,855,980 | 12/1974 | Weisz et al. | 123/3 |
| 3,886,919 | 6/1975 | Freeman | 123/546 |
| 4,046,522 | 9/1977 | Chen et al. | 123/3 |
| 4,070,993 | 1/1978 | Chen | 123/3 |
| 4,088,450 | 5/1978 | Kosaka et al. | 123/DIG. 12 |
| 4,109,461 | 8/1978 | Fujitani et al. | 123/3 |

FOREIGN PATENT DOCUMENTS 48007  7/1980  Japan ..................................... 123/3

Primary Examiner—Ethel R. Cross
Attorney, Agent, or Firm—Beveridge, DeGrandi & Kline

[57] ABSTRACT

An apparatus for the catalytic transformation of fuel for use with an internal combustion engine is described. The apparatus comprises a catalytic reactor in the form of a chamber containing catalytic material, and through which liquid or vaporized fuel is passed, the reactor chamber being in close thermal communication with the exhaust gases leaving the internal combustion engine. Said reactor chamber is either placed within the exhaust gas chamber of the engine exhaust manifold, or in very close proximity thereto. In a preferred arrangement, there are two reactor chambers in series, one being formed within the exhaust manifold of the engine, and the other being mounted closely adjacent thereto.

18 Claims, 8 Drawing Figures

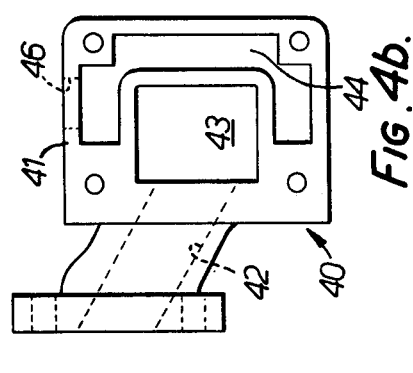
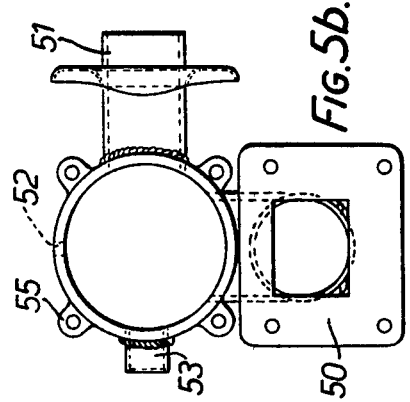
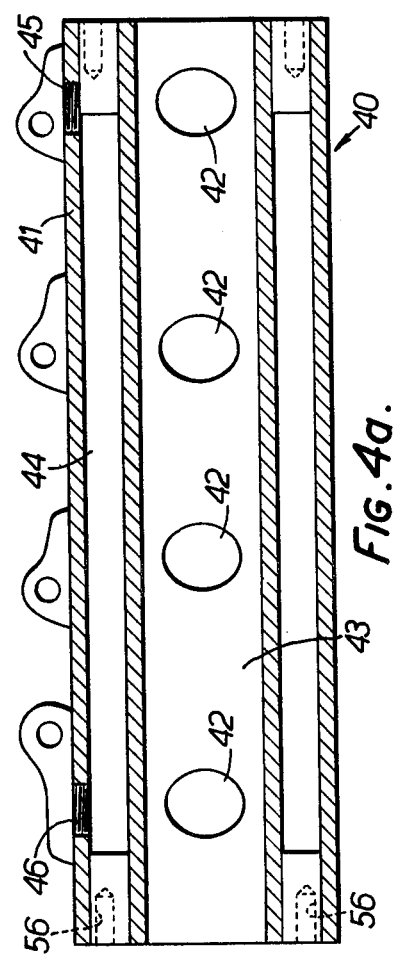
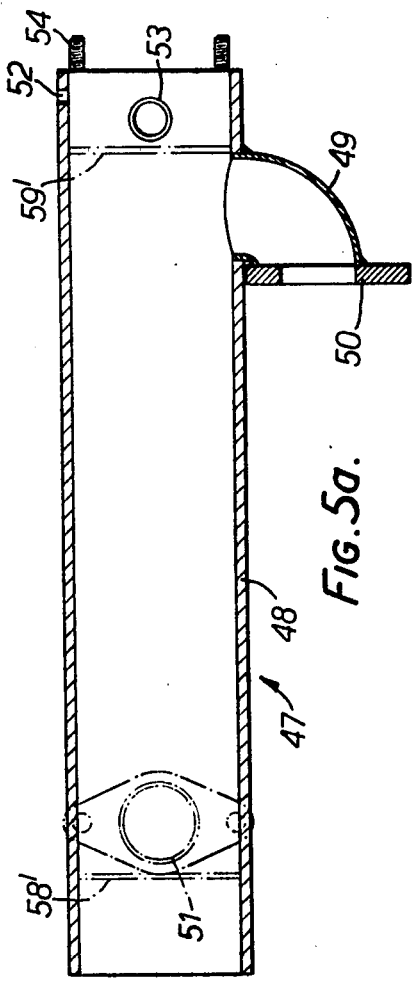

EXHAUST MANIFOLD FOR AN INTERNAL COMBUSTION ENGINE, APPARATUS FOR THE CATALYTIC TRANSFORMATION OF FUEL AND IMPROVED INTERNAL COMBUSTION ENGINE

REFERENCE TO A RELATED APPLICATION

This application is a continuation of our copending application Ser. No. 351,394 filed Feb. 23, 1982, now abandoned, which is relied on and incorporated herein.

The present invention refers to the catalytic transformation of alcohol and/or hydrocarbons and mixture thereof, into combustible gases for carburation, principally ethylene, hydrogen, carbon monoxide, ether, butadiene, and the like.

The main object of this invention is to improve the carburation and power yield of alcohol, gasoline, diesel oil or other liquid fuels in internal combustion engines, not only with a view to economizing fuel, but also to using fuels or different fuels in parallel, which would otherwise be inappropriate for use in a given motor.

According to a first aspect of this invention, an exhaust manifold for an internal combustion engine of the type which comprises a body having a series of inlets for mounting over the exhaust orifices of an internal combustion engine, a chamber in commuciation with said inlets, and an outlet for the exhaust gases of said engine, is characterized by comprising, in thermal communication with said chamber, a catalytic reaction chamber, having a fuel inlet and an outlet for dissociated fuel in the form of gases, said catalytic reaction chamber containing catalytic material.

The exhaust manifold of the invention is especially suitable for use in an automobile using alcohol as fuel. In view of the catalytic conversion being affected within the reactor substantially at the temperature of exhaust gases, there is considerable improvement in the combustion efficiency and, consequently, a considerable reduction in the consumption of alcohol.

The catalytic material within the reaction chamber may comprise any material suitable for promoting catalytic conversion of the liquid fuel into gaseous fuels, such as, for example, alumina ($Al_2O_3$) in the form of pellets or the like, a mixture of alumina with bauxite or copper, nickel, zinc, silver or titanium catalysts, or derivatives thereof. The combustion gases evolved in the reactor, in the case of low grade ethylic alcohol, are complex mixtures continuing about 55% alumina, together with butadiene, ethylene, hydrogen, water steam, oxygen, and other gases in small quantities.

According to another aspect of the invention, an apparatus for the catalytic transformation of fuel into combustible gases for carburation is characterized by comprising a liquid fuel feed line provided with a flow control valve, an exhaust manifold, as defined above, with its fuel inlet connected to said feed line, an outlet line connected to said dissociated gaseous fuel outlet of said manifold and an air-fuel mixer in said outlet line.

Preferably, the apparatus includes a pressure regulator in said outlet line, upstream of the mixer.

In utilizing the above apparatus with an internal combustion engine, the reactor is adapted to be placed within the exhaust manifold of the engine, or forms part of a special manifold, which substitutes the conventional one. Thermal insulation is placed around the discharge manifold.

Further, in accordance with the invention, an internal combustion engine is characterized by being provided with a catalytic transformation apparatus, as described above, said air-fuel mixer being provided with an outlet connected to said inlet manifold.

Preferably the engine is provided with a conventional carburettor having a fuel feed line provided with a valve connected to the outlet of the fuel pump. Moreover, the outlet of said air-fuel mixer may be placed in communication with a carburettor, or connected directly to the inlet manifold of the engine.

The invention will now be described in more detail, by way of example, with reference to the attached drawings, in which:

FIG. 4a is a section, in elevation, of a manifold-reactor according to the present invention;

FIG. 4b is a view in end elevation of the manifold-reactor of FIG. 4a;

FIG. 5a is a section, in elevation, of the body of the pre-reactor to be used in conjunction with the manifold-reactor of FIGS. 4a and 4b;

FIG. 5b is a view in end elevation of pre-reactor body of FIG. 5a;

Figure 1:
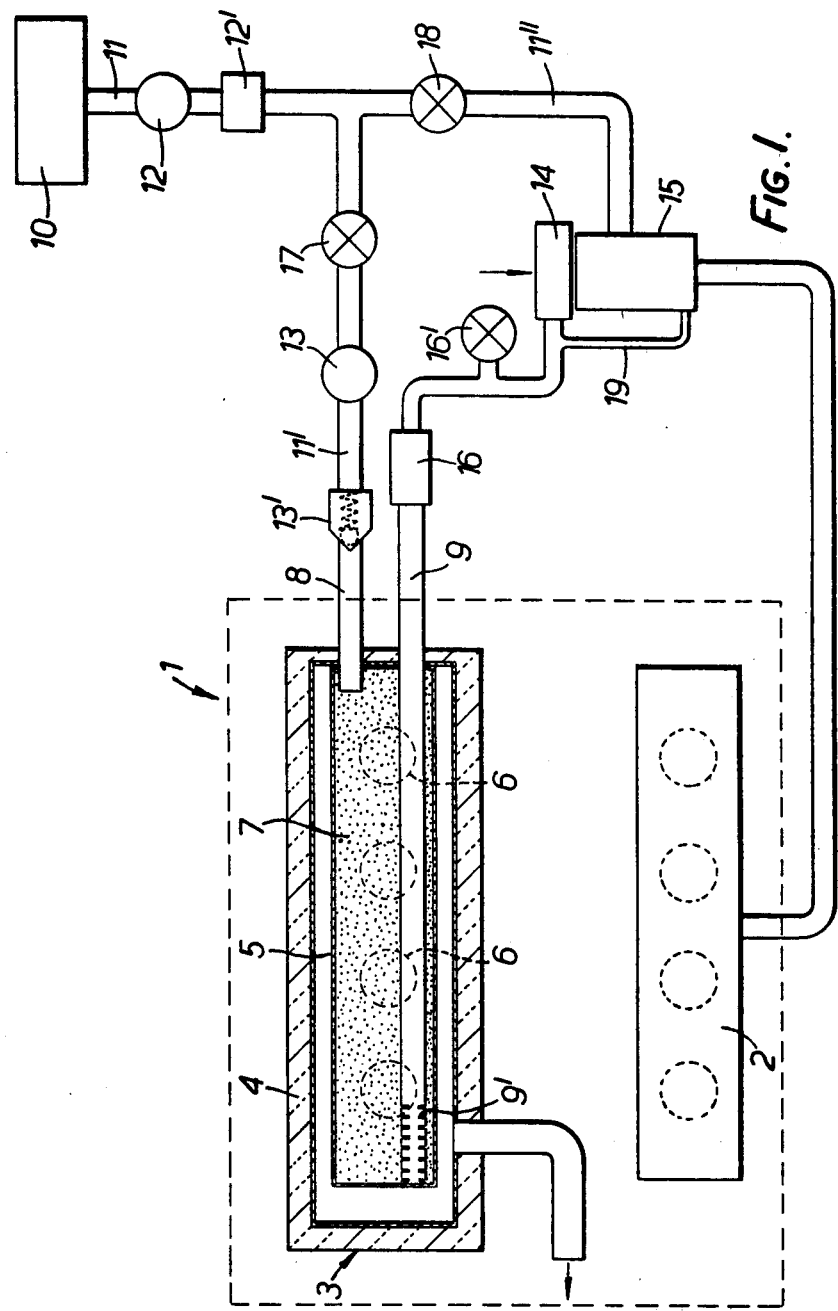
FIG. 1 is a diagrammatic representation of an apparatus according to the present invention, used with an automobile engine running on alcohol.

Referring now to FIG. 1, an internal combustion engine, adapted to use alcohol at elevated compression ratios, is indicated diagrammatically by reference numeral 1. The engine is provided with an inlet manifold 2 and an exhaust manifold 3. The exhaust manifold is, however, substituted for use in the present invention, it being internally insulated at 4, and containing therein a catalytic reactor in the form of a copper walled chamber 5, which extends transversally across the exhaust orifices 6 of the motor so as to ensure maximum heat exchange between the exhaust gases and the interior of the reactor.

Chamber 5 of the catalytic reactor comprises a closed cylinder filled with pellets or pieces of alumina 7. Further within chamber 5, three nickel and silver coated copper wires are extended between its ends so as to serve not only as an additional catalyst, but also further to improve the heat exchange within the chamber.

There is a liquid fuel inlet in the form of a tube 8 passing through one end of chamber 5 and manifold 3. An outlet tube 9 for the gases resulting from the catalytic conversion within the reactor, also passes through the same end of chamber 5 and manifold 3, tube 9 extending within chamber 5 as far as its other end. In the region of this other end, tube 9 is perforated at 9' to permit passage of the catalytic reaction gases, but to prevent the catlytic material from being sucked through the outlet of the reactor.

As may be seen from FIG. 1, the system illustrated further includes a fuel tank 10 and a feed pipe 11 provided with a conventional fuel pump 12 and filter 12'. This feed line is separated into two lines 11' and 11" after the pump, the first line 11' being connected through a flow regulator 13, which is controlled by the accelerator of the vehicle. Downstream of regulator 13, there is a retainer valve 13', which serves to cut fuel feed should the pressure within the reactor exceed that of pump 12. The outlet tube 9 of the reactor contains a filter 16 and a pressure regulator 16' and has its other end connected to an air-fuel mixer 14, which conveniently substitutes the conventional air-filter and is, thus, placed over conventional carburettor 15. Although not illustrated, the air-fuel mixer 14 is provided with a control valve to regulate the quantity of air and, thus, the richness of the mixture entering the carburettor, as well as with another valve, which may be opened to permit passage of air during a heating phase when fuel feed is carried out directly through line 11" from feed line 11.

Pressure regulator 16', which may be a diaphragm type or similar to those used by cars using liquid gas or methane as fuel, ensures a constant fuel pressure at the entrance to mixer 14 so as thus to ensure that the gas-air ratio provided by the mixer is not affected by pressure variations.

Both extensions 11' and 11" of feed line 11 are provided with shut off valves 17 and 18 for the optional use of one or the other branch of the fuel feed circuit.

It should be observed that the engine shown in FIG. 1 will also have a gasoline based starting system, which is conventional in engines using alcohol and which has not been illustrate since it does not form part of the present invention.

Figures 2, 3:
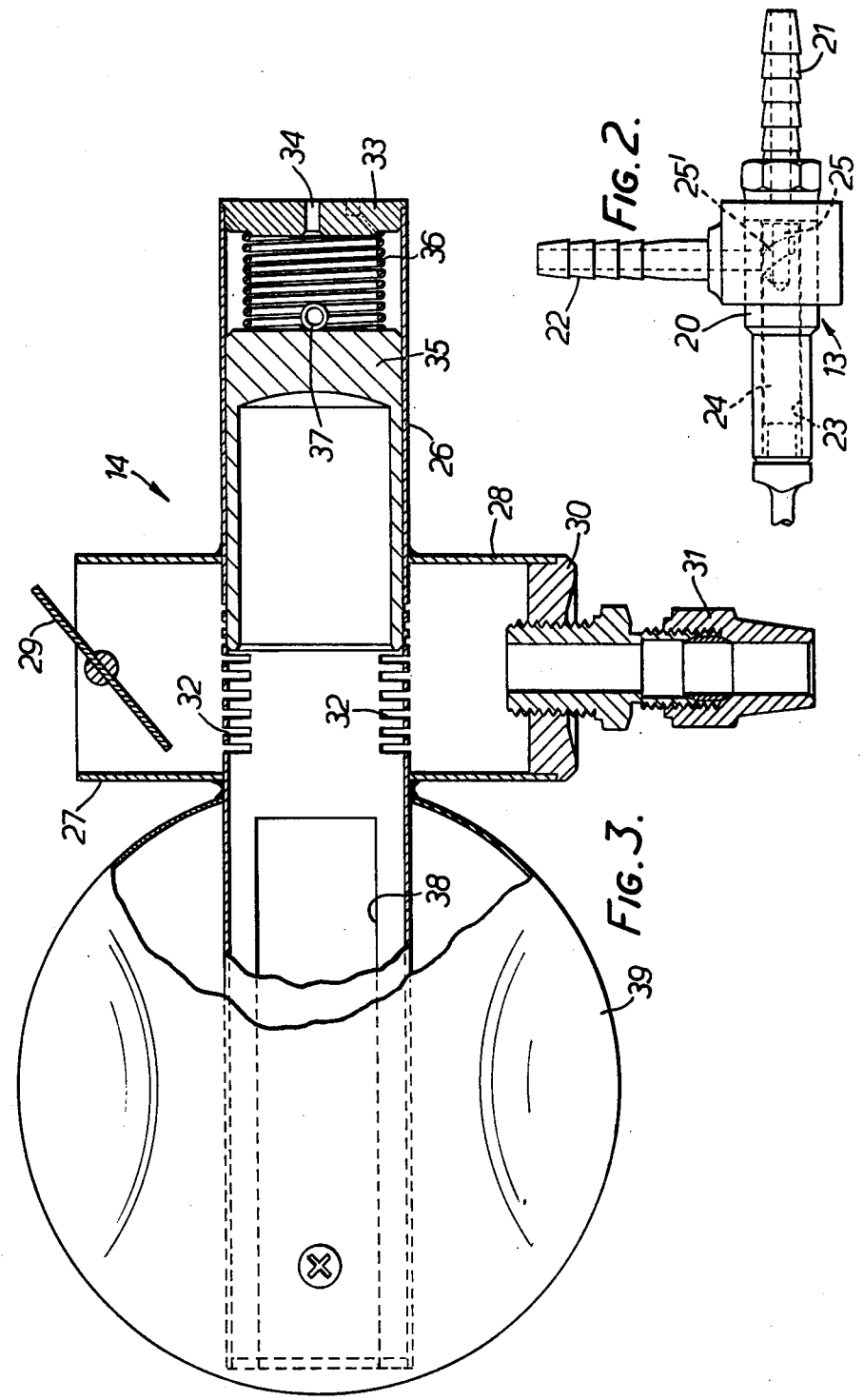
FIG. 2 shows a preferred form of the fuel feed regulator showed diagrammatically in FIG. 1.
FIG. 3 is a plan view, partially in section, of a preferred form of the air-fuel mixer showed diagrammatically in FIG. 1.

FIG. 2 of the drawings shows a preferred form of fuel flow regulator 13, which is automatically controlled by the accelerator of the vehicle. Regulator 13 comprises a body 20 having an inlet 21 and an outlet 22 for liquid fuel. Body 20 is formed with a high precision bore 23 in axial communication with inlet 21 in lateral communication with outlet 22. A valve element 24 having an end projected out of body 20 is fitted into bore 23. Valve element 24 is rotatable by the action of the vehicle accelerator and its outer diameter is precision machined to ensure a seal with the inner surface of body 20 which defines bore 23.

The inner end of valve element 24 is formed with an axial cavity 25 in permanent communication with inlet 21. It is further formed with a partially helical slot 25' in its outer surface so as to provide communication between cavity 25 and outlet 22. Rotation of valve element 24 thus continuously and precisely varies the degree of communication between cavity 25—and thus, inlet 21—and outlet 22. It is clear that other fuel feed regulators could be used, but the regulator 13 shown in FIG. 2 has proved to be simple, but extremely efficient.

FIG. 3 is a plan view, partially in section of a preferred form of the air-fuel mixer 14 of FIG. 1. The mixer of FIG. 3 comprises a pipe 26 having welded thereto two opposed lateral pipe sections 27 and 28 whereby the device is in the shape of a cross. Pipe section 27 is provided with a butterfly 29 to regulate the quantity of air which enters therethrough, whereas the outer end of pipe section 28 is closed by means of a plug 30 centrally provided with an inlet 31 connected to tube 9 carrying the gaseous fuel from the reactor (see FIG. 1).

Main body or pipe 26 of mixer 14 is provided with a series of 9 radial slots 32 on either side thereof, in the region of the air inlet and fuel inlet pipe sections 27 and 28, so as to allow the air and fuel, respectively, to pass into the interior of pipe 26.

One end of pipe 26 is closed by a plug 33 which is provided with an axial opening 34. The same end of pipe 26 receives a slideable piston 35, which is biased by a compression spring 36 in the direction of the other end of the pipe so that the normal position of the piston would be more to the left than that showed in FIG. 3, so as to cover the slots 32 and thus to cut off the air supply through pipe section 27 and the fuel supply through pipe section 28.

The head of piston 35 is provided with a ring 37 suitable for receiving the end of an accelerator cable which leaves the device through opening 34 in plug 33. Thus, on operating the accelerator of the vehicle, piston 35 is displaced to the right in FIG. 3, gradually opening the communication between pipe sections 27 and 28, and the interior of pipe 26.

The other end of pipe 26 is longitudinally cut away to define a downwardly facing opening 38. The upper part of said end of pipe 26 is protected by a cover 39.

The above described mixer is mounted on the engine of FIG. 1 with cover 39 positioned over the open top of carburettor 15, the air-fuel mixture entering the carburettor through opening 38.

Once more, it should be emphasized that mixer 14 of FIG. 3 is only preferred embodiment due to its simplicity and efficiency which have been proved in practice, although, other mixers may naturally be used, such as those utilized in automobiles running on liquid gas or methane.

In operation, and with reference to FIG. 1, once the engine has been started, valve 17 is maintained closed, and valve 18 is maintained open during sufficient time to permit normal operation with direct alcohol feed through line 11", and the conventional carburettor jet. This is a heating period which ends when the catalytic material within reactor 5 has reached a temperature of approximately 300° C., at which time valve 17 is opened and valve 18 is closed so that the engine will continue operating with fuel feed exclusively through catalytic reactor 5.

It has been proved in practice that an engine suitably adapted in accordance with the above description, has an excellent performance with a substantial reduction of fuel (alcohol) consumption, since carburation is very much improved, which is not the case with normal fuel systems, principally with alcohol feed.

Although reactor 5 of FIG. 1 has proved to be efficient in practice, it has been found that many other reactors within the scope of the present invention may be use and, in particular, a combination of two series reactors is presently preferred to ensure a more complete catalytic conversion of the fuel. A preferred embodiment of such a series combination is illustrated in FIGS. 4a, 4b, 5a, 5b, and 6.

FIGS. 4a and 4b comprise, respectively, a longitudinal section and an end elevation of an exhaust manifold for a four-cylinder engine, the manifold being formed integrally with a catalytic reactor.

The manifold-reactor 40 of FIGS. 4a and 4b comprises a cast body 41 having four inlets 42 for the engine exhaust gases, which are in direct communication with a longitudinal open ended chamber 43. Further within cast body 41, there is a second longitudinal chamber 44, which substantially surrounds three sides of chamber 43. Chamber 44 comprises the reactor chamber and has a filling of pellets or pieces of alumina or other catalytic material, as desired.

Reactor chamber 44 is further provided with two upper openings 45 and 46 adjacent, respectively, to its two ends, such openings serving for the entry and exit, respectively, of the fuel undergoing catalytic conversion.

The left hand end (FIG. 4a) of the manifold-reactor is closed by a cover plate (not illustrated) whereas, at its other end, only chamber 44 is closed, exhaust gas chamber 43 being connected at that end to a pre-reactor, as will now be described with reference to FIGS. 5a, 5b, and 6.

FIGS. 5a and 5b comprise a longitudindal section and an end elevation of the body of the pre-reactor 47. This body comprises a simple pipe 48 near one end of which it is provided with an inlet in the form of a curved pipe section 49, with a flange 50, for the entry of exhaust gases. Flange 50 is rectangular and adapted to close the right hand end of the manifold-reactor 40 (FIG. 4a) and to place the exhaust gas chamber 43 of the latter in communication with the interior of pipe 48 by means of curved pipe section 49 (FIG. 5a), at the same time closing the end of reactor chamber 44.

Pipe 48 is further formed with an exhaust gas outlet 51 spaced somewhat from its other end, as well as with two openings 52 and 53 adjacent the first mentioned end thereof for the entry and exit of fuel.

The right hand end (FIG. 5a) of pipe 48 is closed by a cover plate (not illustrated), fixed by four bolts 54. The left hand ends both of pipe 48 and of the manifold-reactor of FIG. 4a are closed by a single cover plate (not shown) using bolt receiving lugs 55 (FIG. 5b) and bolt receiving cavities 56 (FIG. 4a–4b, respectively).

Figure 6:
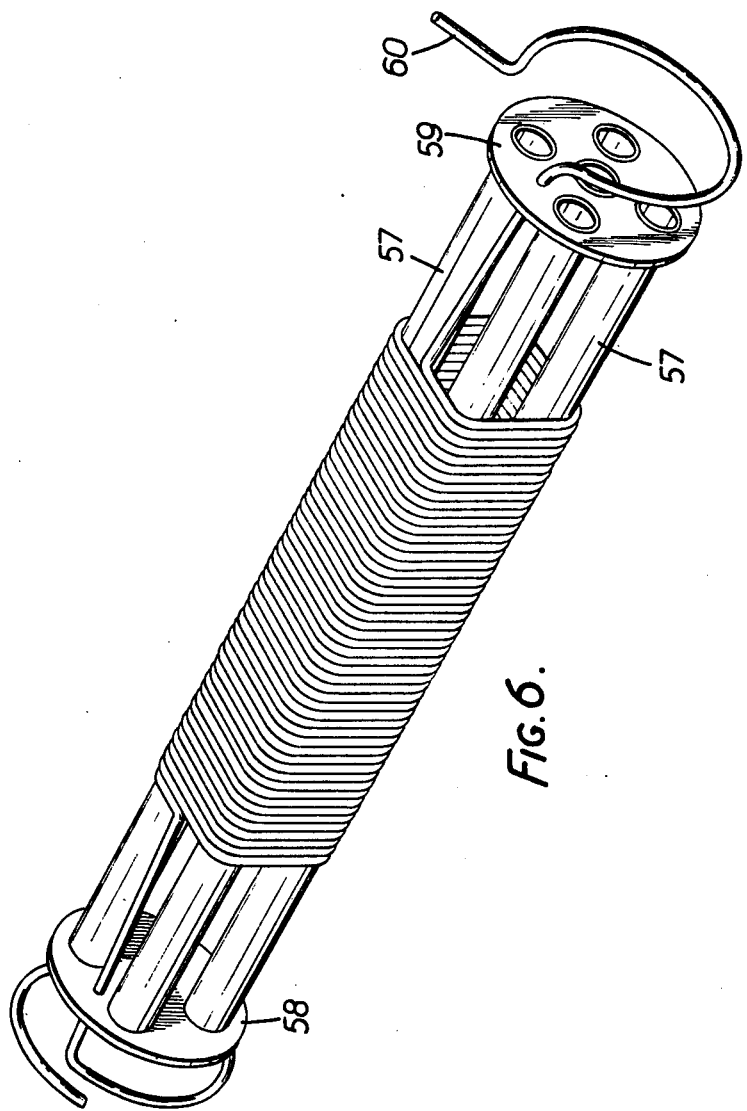
FIG. 6 is a perspective view of the structure of the pre-reactor of FIGS. 5a and 5b.

FIG. 6 is a perspective view of the structure of the prereactor 47, which is housed within pipe or body 48 (FIG. 5).

The pre-reactor structure comprises a series of five tubes 57 mounted between two end disks 58 and 59. Each of the disks 58 and 59 is formed with five orifices, which receive the respective ends of tubes 57. These tubes contain fillings of pellets or pieces of alumina or other catalytic material, as desired.

Each of the disks 58 and 59 has a diameter equal to the inner diameter of pipe 48 of FIG. 5a so that, on inserting the pre-reactor structure within pipe 48, disk 58 is positioned slightly to the left of exhaust gas outlet orifice 51 whereas disk 59, at the other end of the pre-reactor, will be positioned slightly to the right of exhaust gas inlet 49. With reference to FIG. 5a, the final positions of disks 58 and 59 are indicated by dotted lines 58' and 59'. It will be understood, therefore, that during use of the reactor, the exhaust gases leaving the manifold-reactor 40 will enter pre-reactor 47 through curved pipe section 49 and will leave it through outlet 51, the exhaust gas flow being limited within the pre-reactor body 48 by the space between disks 58 and 59.

With further reference to FIG. 6, the pre-reactor structure is provided with a fuel inlet pipe 60 wound around the arrangement of pre-reactor tubes 57, with its ends passing through disks 58 and 59. The right hand end of pipe 60 enters body 48 through orifice 52, whereas the other end of pipe 60 is positioned within the space defined between the left hand end of body 48 (FIG. 5a) and disk 58.

During operation with the exhaust gases passing first through chamber 43 of the manifold-reactor 40 and then through inner space of pre-reactor 47, liquid fuel enters the right hand end of fuel feed pipe 60 (FIG. 6) for pre-heating in its coiled section and exits from the other end of pipe 60 to the left of disk 58. The fuel leaving pipe 60 is already vaporized and then passes into the catalytic material-containing tubes 57, within which it undergoes a first catalytic transformation. It then leaves tubes 59 to enter the space defined between disk 59 and the cover plate (not illustrated) at the right hand end (FIG. 5) of pre-reactor 47.

The fuel, already partially transformed, leaves the pre-reactor through orifice 53 to be led by a pipe (not illustrated) to the upper fuel inlet orifice 45 of the manifold-collector of FIG. 4a. Catalytic transformation is completed in chamber 44 and the transformed gases leave through orifice 46 to enter a line equivalent to line 9 of FIG. 1.

It will be understood that the series reactor arrangement of FIGS. 4 to 6 is a preferred configuration since it provides pre-heating and vaporization of the liquid fuel within fuel feed pipe 60, a first catalytic conversion step within pre-reactor 47 and a second catalytic conversion step in the manifold-reactor 40.

Experiments carried out using the reactor arrangement of FIGS. 4a, 4b, 5a, 5b, and 6, together with the variable fuel regulator shown in FIG. 2 and the air-fuel mixture of FIG. 3, have shown that the ideal catalysis temperature with an alumina catalystis in the region 350° C., operating with a pressure around 1.5 to two atmospheres. Although a complete chemical analysis of the combustion gases after catalytic transformation has not yet been made, it is estimated that at the above mentioned temperature and pressure, and using hydrated alcohol (ethanol) as fuel, such gases comprise principally ethylene, steam, and hidrogen with other gases in small quantities.

It has also been demonstrated that, perhaps due to the high steam content, the temperature of the cyinder head of the engine is substantially lower than when one uses an alcohol powered engine using a conventional fuel feed system, even though the latter uses a lower pressure ratio (1 : 11) when compared with the 1 : 14, 7 used in the experiments.

Apart from the road tests, laboratory experiments showed that, after dissociation in a reactor according to the present invention, the fuel gases produced from hydrated alcohol have a calorific value and an octane rating considerably above those of the best gasolines available.

In addition, the system of the present invention may be used with diesel engines and even permits one to use alcohol in standard diesel engines without any modification being necessary in the engine, apart from attaching thereto the new fuel feed circuit.

An interesting characteristic of the present invention is that the compression ratio of the engine is no longer a limiting factor due to the fact that the fuel feed comprises a mixture of gases in optimum conditions for combustion. The system may be used with considerably elevated compression ratios (13 : 5 to 15 : 1 for spark ignition engines), which increases engine efficiency considerably. For example, road tests with a non-optimized prototype resulted in fuel consumptions of 40 to 50% less then the same vehicle using alcohol with a conventional feed system. In addition, it should be noted that the exhaust gases are substantially pollution-free.

It will be understood that the invention has been described with reference to certain presently preferred embodiments, but that the true scope thereof is to be limited only by the attached claims.

We claim:

1. Exhaust manifold for an internal combustion engine which comprises a body having a plurality of inlets for mounting over the exhaust orifices of an internal combustion engine, a first chamber in said body in communication with said inlets, and an outlet for the exhaust gases of said engine, and a second chamber in said body in thermal communication with said first chamber, one of said first and second chambers surrounding the other of said chambers, said second chamber being a catalytic reaction chamber having a fuel inlet and an outlet for dissociated fuel in the form of gases, said catalytic reaction chamber containing catalytic material effective for the catalytic conversion of a liquid fuel into a gaseous fuel.

2. Exhaust manifold according to claim 1, said catalytic chamber is positioned within an engine exhaust gas chamber of the manifold.

3. Exhaust manifold according to claim 1 a further comprising pre-reactor, having an inlet for the engine exhaust gases, connected to said exhaust gas outlet of said body, a second inner chamber in communication with said pre-reactor inlet, and an outlet from said second chamber, and at least one pre-reactor chamber in thermal communication with said second chamber, containing catalytic material and provided with a second fuel inlet and a second fuel outlet for at least partially dissociated fuel in the form of gases.

4. Exhaust manifold according to claim 3, further comprising a fuel pre-heater, for pre-heating and at least partially vaporizing liquid fuel, having an outlet in communication with said second fuel inlet to said pre-reactor chamber.

5. Exhaust manifold, according to claim 1 which is externally covered with thermal insulation material.

6. Apparatus for the catalytic transformation of fuel into combustible gases, comprising a liquid fuel feed line provided with a flow control valve; an exhaust manifold according to claim 1 having a fuel inlet connected to said feed line; an outlet line connected to said dissociated gaseous fuel outlet from said manifold; and an air-fuel mixer in said outlet line.

7. Apparatus for the catalytic transformation of fuel into combustible gas comprising:
  (a) a liquid fuel feed line;
  (b) a flow control valve on said feed line;
  (c) an exhaust manifold having a fuel inlet connected to said feed line and comprising a cast metal body having a plurality of inlets arranged for mounting over the exhaust orifices of an internal combustion engine, a first inner chamber formed in said body in communication with said inlets and having an exhaust gas outlet, and a second inner reactor chamber formed in said body, connected to said fuel inlet and having a fuel outlet for dissociated fuel in the form of gases, said reactor chamber containing catalytic material;
  (d) an outlet line connected to said reactor chamber fuel outlet; and
  (e) an air-fuel mixer in said outlet line.

8. Apparatus according to claim 7 in which one of said first and second chambers at least partially surrounds the other said chamber.

9. Apparatus according to claim 8 in which said second chamber at least partially surrounds said first chamber.

10. Apparatus according to claim 7, in which said manifold has associated therewith a pre-reactor having an inlet for the engine exhaust gases connected to said exhaust gas outlet of said body, a third inner chamber in communication with said pre-reactor exhaust gas inlet and having an outlet; and at least one pre-reactor chamber containing catalytic material, in thermal communication with said third inner chamber, and provided with a respective fuel inlet connected to said fuel feed line and a respective fuel outlet connected to said manifold fuel inlet.

11. Improved internal combustion engine comprising inlet and exhaust manifolds and a catalytic transformation apparatus according to claim 6, said air-fuel mixer being provided with an outlet in communication with said inlet manifold.

12. Improved internal combustion engine comprising inlet and exhaust manifolds and a catalytic transformation apparatus according to claim 8, said air-fuel mixer being provided with an outlet in communication with said inlet manifold.

13. Improved internal combustion engine comprising inlet and exhaust manifold and a catalytic transformation apparatus according to claim 10, said air-fuel mixer being provided with an outlet in communication with said inlet manifold.

14. Engine according to claim 11, which further comprises a carburettor connected to said inlet manifold said outlet from the air-fuel mixer being arranged at the conventional air inlet of the carburettor.

15. Engine according to claim 12, which further comprises a carburettor connected to said inlet manifold said outlet from the air-fuel mixer being arranged at the conventional air inlet of the carburettor.

16. Engine according to claim 13, which further comprises a carburettor connected to said inlet manifold said outlet from the air-fuel mixer being arranged at the conventional air inlet of the carburettor.

17. Exhaust manifold according to claim 1, wherein said second chamber at least partially surrounds said first chamber.

18. Exhaust manifold according to claim 1, wherein said first chamber at least partially surrounds the second chamber.

* * * * *